United States Patent
Yamagishi et al.

(10) Patent No.: US 10,684,539 B2
(45) Date of Patent: Jun. 16, 2020

(54) LIGHTING DEVICE AND PROJECTION DISPLAY APPARATUS

(71) Applicant: Panasonic Intellectual Property Management Co., Ltd., Osaka (JP)

(72) Inventors: Shigekazu Yamagishi, Osaka (JP); Takashi Ikeda, Osaka (JP); Masafumi Tanaka, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/128,452

(22) Filed: Sep. 11, 2018

(65) Prior Publication Data

US 2019/0086778 A1    Mar. 21, 2019

(30) Foreign Application Priority Data

Sep. 19, 2017   (JP) .................................. 2017-178538
Jul. 9, 2018    (JP) .................................. 2018-129572

(51) Int. Cl.
*G03B 21/20*   (2006.01)
*G03B 21/16*   (2006.01)

(52) U.S. Cl.
CPC ........... *G03B 21/204* (2013.01); *G03B 21/16* (2013.01); *G03B 21/2066* (2013.01)

(58) Field of Classification Search
CPC .. G03B 21/16; G03B 21/204; G03B 21/2013; G03B 21/2033; G03B 21/2053; G03B 21/2066; F21V 9/00; F21V 9/08; F21V 9/20; F21V 9/30; F21V 9/40
See application file for complete search history.

(56) References Cited

U.S. PATENT DOCUMENTS

| | | | | |
|---|---|---|---|---|
| 2008/0079910 A1* | 4/2008 | Rutherford | ........ | G03B 21/2013 353/84 |
| 2012/0019788 A1* | 1/2012 | Katou | ................ | G02B 26/0833 353/33 |
| 2014/0204398 A1* | 7/2014 | Sato | ..................... | B60Q 1/0023 356/614 |
| 2014/0254133 A1* | 9/2014 | Kotter | ..................... | C09K 11/02 362/84 |
| 2015/0092164 A1* | 4/2015 | Lin | ........................ | G03B 21/16 353/57 |
| 2015/0116671 A1* | 4/2015 | Kuroi | ..................... | C09K 11/02 353/84 |
| 2015/0276177 A1* | 10/2015 | Maeda | ................. | G03B 21/204 353/84 |

(Continued)

FOREIGN PATENT DOCUMENTS

| | | |
|---|---|---|
| JP | 2012-037724 | 2/2012 |
| JP | 2012-129135 | 7/2012 |
| JP | 2013-102078 | 5/2013 |

*Primary Examiner* — Sultan Chowdhury
(74) *Attorney, Agent, or Firm* — McDermott Will and Emery LLP (57) ABSTRACT

A lighting device of the present disclosure includes: an excitation light source; a phosphor for receiving an excitation light from the excitation light source and emitting a fluorescent light; a spreader for supporting the phosphor; and a reflective layer disposed between the phosphor and the spreader and reflecting the fluorescent light. The phosphor is a plurality of phosphor pieces disposed to be adjacent to each other and having the same characteristic.

2 Claims, 4 Drawing Sheets

(56) References Cited

U.S. PATENT DOCUMENTS

| | | | |
|---|---|---|---|
| 2017/0269463 A1* | 9/2017 | Katsumata | G03B 21/204 |
| 2017/0293211 A1* | 10/2017 | Kobayashi | G03B 21/00 |
| 2018/0031207 A1* | 2/2018 | Chang | F21V 9/45 |
| 2019/0056645 A1* | 2/2019 | Takamatsu | F21V 9/30 |

* cited by examiner

LIGHTING DEVICE AND PROJECTION DISPLAY APPARATUS

BACKGROUND

1. Field of the Invention

The present disclosure relates to a lighting device using a phosphor, and a projection display apparatus using the lighting device as a light source.

2. Description of the Related Art

Patent Literature 1 (Unexamined Japanese Patent Publication No. 2012-129135) discloses that the directivity of light emission is controlled by blocking the gaps between divided phosphors with light absorbing materials. When the light emission intensity estimated for illumination or the like is used, however, the light absorbing materials generate a remarkably large amount of heat. This method is not practical in consideration of the temperature quenching characteristic of phosphors. Patent Literature 2 (Unexamined Japanese Patent Publication No. 2013-102078) discloses a technology in which a more effective wall is disposed on the interface between phosphors and this wall is used as a metal reflective face. Also in this technology, the interface between adjacent phosphors has a specific property. Furthermore, metals having different thermal expansions are disposed on the interface, so that the reliability is reduced.

In either technology, different materials are disposed between phosphors and the excitation light entering the materials is wasted. Therefore, the efficiency is obviously reduced.

SUMMARY

A lighting device capable of achieving a high reliability at which a delamination fracture does not occur even when a phosphor has received strong excitation energy is provided.

A lighting device of the present disclosure includes: an excitation light source; a phosphor for receiving an excitation light from the excitation light source and emitting a fluorescent light; a spreader for supporting the phosphor; and a reflective layer disposed between the phosphor and the spreader and reflecting the fluorescent light. The phosphor is a plurality of phosphor pieces disposed to be adjacent to each other and having the same characteristic.

A lighting device of the present disclosure can achieve a high reliability at which a delamination fracture does not occur even when a phosphor has received strong excitation energy.

DETAILED DESCRIPTION OF THE PREFERRED EMBODIMENTS

Hereinafter, exemplary embodiments are described in detail appropriately with reference to the accompanying drawings. Here, unnecessarily detailed descriptions are sometimes omitted. For example, the detailed descriptions of well-known items or the redundant descriptions of substantially the same configuration are sometimes omitted. The objective of the omission is to avoid unnecessary redundancy of the following descriptions and to allow persons skilled in the art to easily understand the present disclosure.

The accompanying drawings and the following descriptions are provided to allow the persons skilled in the art to sufficiently understand the present disclosure. The drawings and descriptions are not intended to restrict the subjects described in the claims.

First Exemplary Embodiment

Figure 1:
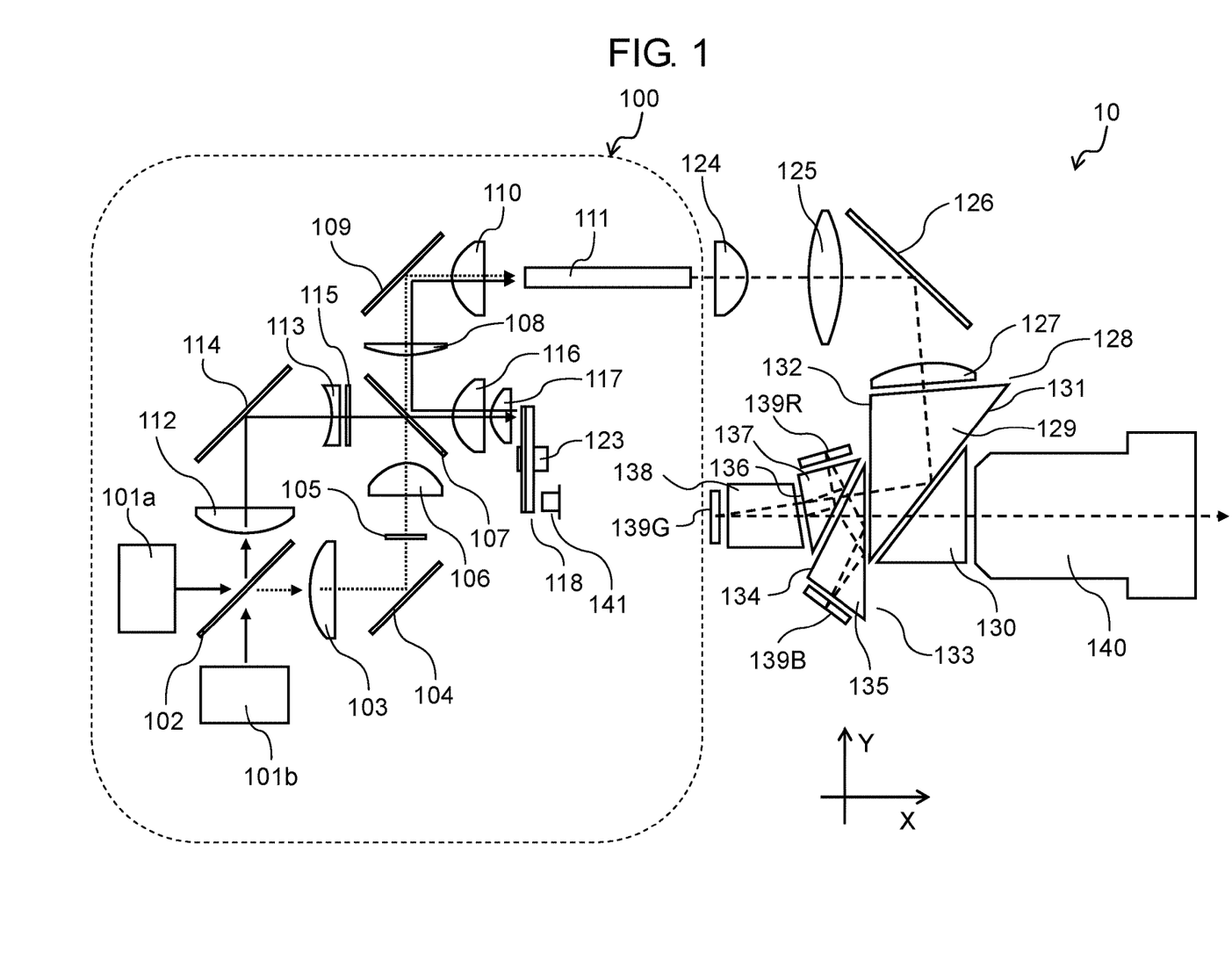
FIG. 1 is a diagram showing a projection display apparatus using a phosphor wheel device in accordance with a first exemplary embodiment.
Figure 2:
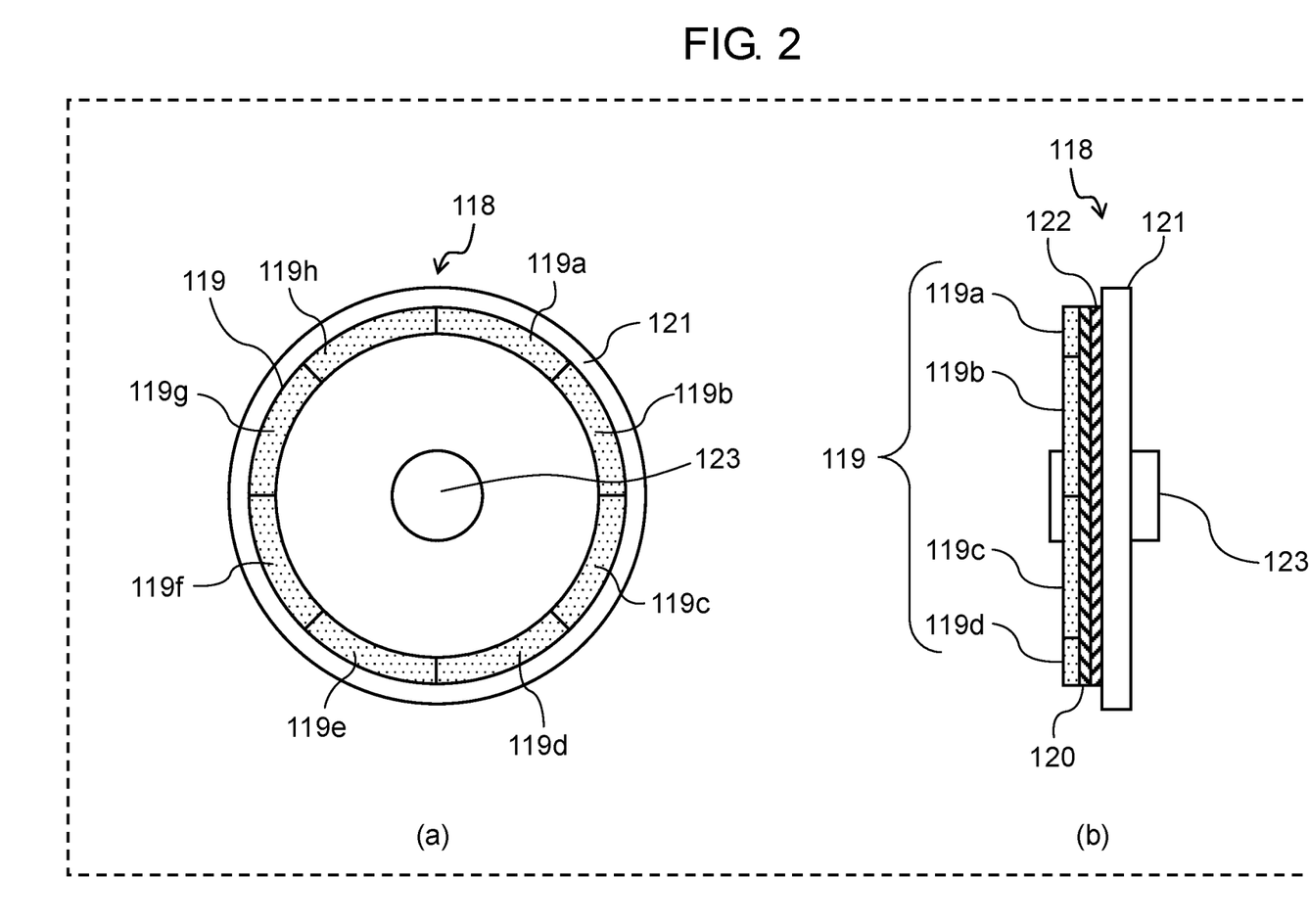
FIG. 2 is a diagram showing the phosphor wheel device.

Hereinafter, a first exemplary embodiment is described with reference to FIG. 1 and FIG. 2. FIG. 1 is a diagram showing projection display apparatus 10 that uses, as a light source, phosphor lighting device 100 including phosphor wheel device 118. FIG. 2 is a diagram showing phosphor wheel device 118, FIG. 2(a) is a front view of phosphor wheel device 118, and FIG. 2(b) is a side view of phosphor wheel device 118. Here, the hatching in FIG. 2 allows the configuration to be understood, and does not show the cross section.

In FIG. 1, blue laser diode units 101a and 101b for light sources include: a plurality of blue laser diodes; and collimating lenses disposed on the outgoing side correspondingly to the lasers. Laser beams can be output so as to suppress the spread of them. Here, blue laser diode units 101a and 101b are examples of excitation light sources.

Blue laser beams coming from blue laser diode unit 101a enter mirror 102 having a partial opening. After entering the mirror, a part of the light is radiated in the +X direction through an opening of mirror 102 having the partial opening, and the remaining light enters a reflective portion and is reflected in the +Y direction. The light coming from blue laser diode unit 101b also enters mirror 102 having the partial opening. After entering the mirror, similarly, a part of the light is radiated in the +Y direction through the opening of mirror 102 having the partial opening, and the remaining light enters the reflective portion and is reflected in the +X direction. The opening shape of mirror 102 having the partial opening is designed so that the quantity of the light travelling in the +Y direction is greater than the quantity of the light travelling in the +X direction, of the light coming from each of blue laser diode units 101a and 101b.

The blue-color light that has been radiated in the +X direction is collected by lens 103, is reflected by mirror 104, and then is collected to the proximity of diffuser 105. Then, the light enters condenser lens 106, becomes a substantially parallel light, and enters dichroic mirror 107. Dichroic mirror 107 has a property of allowing blue-color light to pass through it and reflecting color lights of the other color. Blue laser beams include blue-color light, so that the blue laser beams pass through dichroic mirror 107. After dichroic mirror 107, the blue laser beams pass through lens 108, mirror 109, and lens 110, and are collected to the incident face of rod integrator 111 having a rectangular opening.

The light that has travelled in the +Y direction through mirror 102 having the partial opening is focused by lens 112 and lens 113, and is radiated to diffuser 115. Here, lens 112 and lens 113 constitute an a focal system on both sides of mirror 114. The blue laser beams that have been radiated to diffuser 115 are diffused by it, pass through dichroic mirror 107, and then enter condenser lenses 116 and 117. After condenser lenses 116 and 117, the blue laser beams come as excitation light into phosphor 119 of phosphor wheel device 118.

As shown in FIG. 2, in phosphor 119 of phosphor wheel device 118, phosphor pieces 119a to 119h having the same characteristic are disposed close to each other at butted portions. In the butted portions, the cross sections (faces perpendicular to the paper plane) of the phosphor pieces are butted against each other. These phosphor pieces constitute a ceramic phosphor made of a YAG phosphor, and have a characteristic of emitting yellow-color light upon receiving the excitation light. On the surfaces of the phosphor pieces that are reverse to the excitation light incident face, reflective layer 120 is formed which has a property of reflecting the light having a wavelength (fluorescent wavelength) of fluorescent light. Reflective layer 120 is formed on a surface of spreader 121 that is made of a material having a high thermal conductivity, and is fixed to the spreader 121 via a light-transmitting adhesive layer 122. Here, adhesive layer 122 is disposed between reflective layer 120 and spreader 121.

Spreader 121 is generally called a heat spreader, and spreader 121 of the present exemplary embodiment has a disk shape. On the face of the reflective layer formed in the spreader, a plurality of phosphor pieces 119a to 119h are adjacently disposed so as to form an annular shape in the circumferential direction. Motor 123 is disposed in the center of the spreader so that the spreader can rotate.

When the blue laser beams have entered the phosphor, the blue laser beams are converted into yellow-color light, are reflected by the reflective layer existing on the back side, and are radiated to the condenser lens 117 side. The yellow-color light passes through condenser lens 117, passes through condenser lens 116, and enters dichroic mirror 107. The yellow-color light is reflected by this mirror, passes through lens 108, mirror 109, and lens 110, and is collected to the incident face of rod integrator 111 having a rectangular opening. This behavior is similar to the blue laser beams (blue-color light) that have passed through dichroic mirror 107. As a result, the blue-color light of the laser light source is superimposed on the yellow-color light of the fluorescent light, thereby producing white-color light.

The light outgoing from rod integrator 111 passes through relay lenses 124 and 125, is reflected by reflection mirror 126, passes through field lens 127, and then enters total internal reflection prism 128. Total internal reflection prism 128 is formed by fixing first prism 129 to second prism 130 while keeping a slight gap. The light having entered total internal reflection prism 128 is totally reflected by face 131, and comes into color prism unit 133 through face 132.

Color prism unit 133 is formed by bonding and fixing the following prisms to each other:
first prism 135 including dichroic mirror face 134 having a property of reflecting blue-color light;
second prism 137 including dichroic mirror face 136 having a property of reflecting red-color light; and
third prism 138.

End faces of respective prisms include digital micro-mirror devices (DMDs) 139R, 139G, and 139B as shown in FIG. 1. In these DMDs, very small mirrors corresponding to pixels are disposed two-dimensionally, and the falling directions are controlled in two directions in response to an image signal from the outside. At the falling angle during the ON signal, the reflected light having been reflected by a very small mirror returns to color prism unit 133 at an incident angle of V During the OFF signal, the reflected light enters color prism unit 133 again at a wide angle. DMD 139B is used for blue light modulation, DMD 139R is used for red light modulation, and DMD 139G is used for green light modulation. Thus, the DMDs are examples of an image display element that modulates the light outgoing from phosphor lighting device 100 in response to the image signal and generates image light.

Color light corresponding to the ON signal in the pixel of each of DMDs 139R, 139G, and 139B achieves color display in the following processes:
the color light returns to color prism unit 133 again;
the color light passes through first prism 129 and second prism 130 of total internal reflection prism 128, and then enters projection lens 140; and
the projection lens enlarges and projects, on a screen (not shown), the image light generated by the DMDs.

There is a possibility that a slight gap occurs in the butted portions between phosphor pieces 119a to 119h, but the shape of the gap is not projected. That is because there is not a conjugate relationship between the surface of phosphor 119 on which a spot pattern of the excitation light is formed and the screen face on which the image light is projected. However, the possibility of causing a slight reduction in the output of fluorescent light cannot be denied. Therefore, when the reduction is not allowed, rotation detection sensor 141 for detecting the rotation position of the disk-shaped spreader is disposed in the phosphor wheel device, or the motor itself is made to have a rotation position detection function. Furthermore, by synchronizing the rotation timing of the spreader with the output of the excitation light or the control by the image signal, a slight luminance change can be also corrected.

Thus, rotation detection sensor 141 is one example of a detector for detecting the rotation positions of the butted portions between the plurality of phosphor pieces on the disk-shaped spreader. Phosphor lighting device 100 has a function of changing the output of the image display to suppress the luminance change at timings at which the incident excitation light arrives at the butted portions between the phosphor pieces. In order to change the output of the image display to suppress the luminance change of the image light, at timings at which the incident excitation light arrives at the butted portions between the phosphor pieces, for example, the following process may be performed:
the output of yellow-color light as the fluorescent light is corrected by increasing the output of the excitation light; or
control for emphasizing the yellow color in the control of the image signal is performed.

Lights coming into phosphor pieces 119a to 119h have a high energy. The conversion efficiency of the phosphor is about 50%, so that a half of the incident energy becomes heat. The thermal expansion coefficient of the YAG phosphor is $4 \times 10^{-6}1°$ C., and the thermal expansion coefficient produced when the spreader is made of an aluminum material is $24.5 \times 10^{-6}1°$ C. Therefore, when the temperature increases, a strain can occur to cause peeling between the phosphor and the spreader that are bonded to each other. When the phosphor is formed of the plurality of phosphor pieces 119a to 119h as shown in the present exemplary embodiment, the following advantage is produced:
even when the temperature increases, the gaps between phosphor pieces 119a to 119h slightly increase, the stress is released, and destruction is not caused.

It is desirable that the number of phosphor pieces is determined on the basis of the temperature increase and the difference between thermal expansion coefficients of materials. Furthermore, the gaps between the phosphor pieces slightly decrease the conversion efficiency of the incident light, but do not affect the final video image. That is because the excitation light coming into the phosphor is spot light having a certain area.

In the above mentioned configuration, phosphor pieces 119a to 119h are fixed to spreader 121 via adhesive layer 122, and, actually, the thermal conductivity often decreases in this adhesive layer part. In the configuration where a stress strain is easily released as discussed above, however, the adhesive layer does not require a stress absorption function and hence can be formed in an extremely thin shape. In this configuration, the reflective layer, the adhesive layer, and the spreader are disposed in this sequence from the phosphor side. When the adhesive layer is made of a light-transmitting material and is transparent, however, the sequence of the reflective layer and the adhesive layer can be changed. When the adhesive layer has a reflective characteristic, a reflective layer is not required separately. Therefore, an adhesive layer that has a reflective characteristic and is formed by adding a reflective material to a light-transmitting adhesive may be employed without separately using the reflective layer and the adhesive layer.

Furthermore, spreader 121 is made of an aluminum material in this case, but spreader 121 may be made of a thermally conductive metal having a high thermal conductivity, such as a copper material.

Furthermore, it is desirable that spreader 121 is made of ceramic (silicon carbide or silicon nitride), which is a material having a high thermal conductivity and a thermal expansion coefficient close to that of the phosphor. The thermal expansion coefficients of both compounds are equivalent to that of the phosphor, but the silicon carbide is more preferable because it has a thermal conductivity close to that of aluminum. These compounds can suppress the occurrence of stress due to the difference in thermal expansion coefficient between the spreader and the phosphor. Therefore, the thickness of adhesive layer 122 for bonding the phosphor pieces to the spreader can be suppressed. This suppression reduces the temperature increase of the phosphor having been irradiated with the excitation light. Depending on the operating temperature limit, the processing can be performed even by means of diffusion bonding or the like that does not require an adhesive layer. In the diffusion bonding, the bonding is performed by diffusion of atoms in the material in accordance with the pressure and temperature. Therefore, differently from the case of using an adhesive, the thermal conductivity is not adversely affected, and a more excellent heat-dissipation structure can be achieved. In the case that the phosphor can be directly formed on the ceramic spreader—even when the phosphor is made of an inorganic material—, the phosphor can be certainly produced without using a bonding and adhesive means such as the diffusion bonding. In such manner, the phosphor pieces can be fixed to the spreader via the reflective layer by diffusion bonding.

During the adhesion, the phosphor pieces can be fixed to each other by, not only using an adhesive, but also using soldering or silver brazing in which a stress release effect cannot be expected.

Phosphor lighting device 100 can be formed as a lighting device and can generate white-color light, so that phosphor lighting device 100 can be applicable to not only a projection display apparatus but also general lighting. In phosphor lighting device 100, especially, the configuration of phosphor wheel device 118 is distinctive, and is not limited to the optical path of the excitation light and is not limited to the configuration range from the phosphor wheel device to the rod integrator.

In this case, phosphor 119 is formed by arranging a plurality of phosphor pieces having the same characteristic on disk-like spreader 121. In the case of the projection display apparatus of color-displaying an image light in a time division for example, however, two or three types of phosphor for emitting different color lights can be arranged on the disk-like spreader 121. In this case, the effect equivalent to the above-mentioned effect can be produced also by forming the phosphor of each color light as an aggregate of a plurality of phosphor pieces as discussed above.

Furthermore, in order to generate an outgoing light of a high output, a lighting device can be configured in which two phosphor wheel devices are disposed, the heat load is dispersed, and fluorescent light is optically synthesized. Also in this case, when the excitation light comes into the butted portions of the phosphor pieces as discussed above, there is a possibility that the output of the fluorescent light slightly decreases. In the case of using a plurality of phosphor wheel devices each of which includes a disk-like spreader having a plurality of annularly arranged phosphor pieces, the detection of the output reduction of the fluorescent light can be suppressed by the following process:

the rotation of the spreader is controlled so that the timings at which excitation lights come into the butted portions of the phosphor pieces change between the phosphor wheel devices.

Second Exemplary Embodiment

Figure 3:
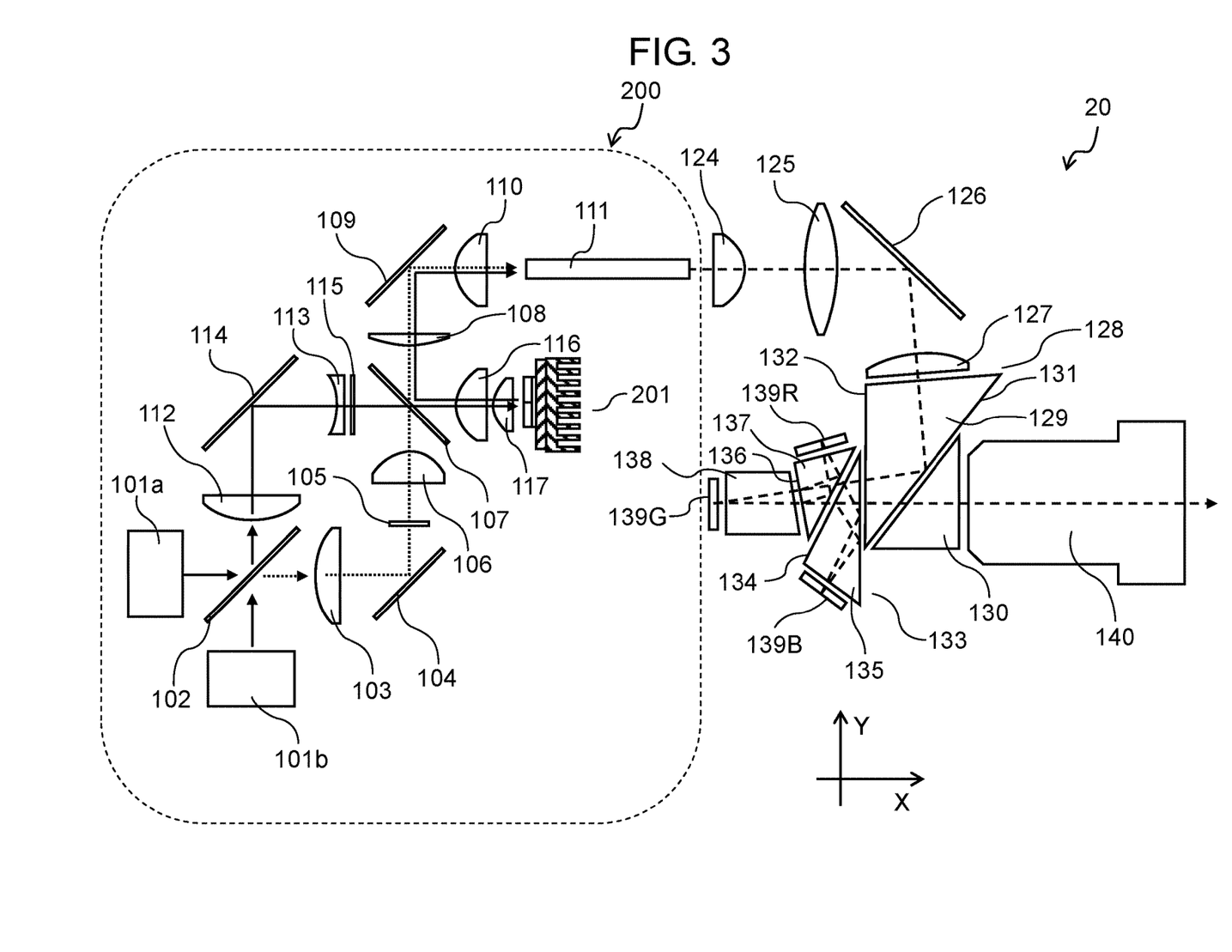
FIG. 3 is a diagram showing a projection display apparatus using a fixed phosphor device in accordance with a second exemplary embodiment.
Figure 4:
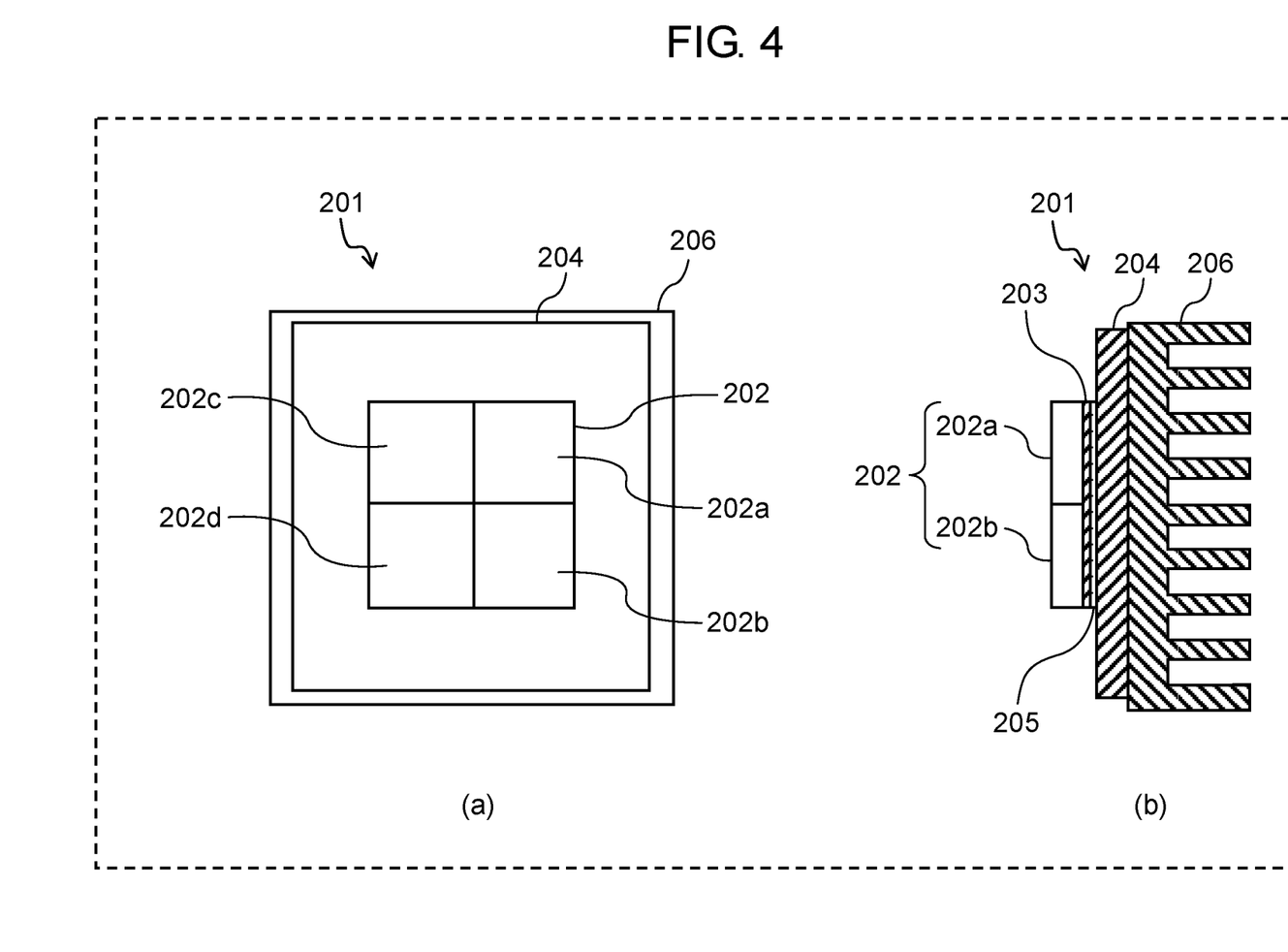
FIG. 4 is a diagram showing the fixed phosphor device.

Hereinafter, a second exemplary embodiment is described with reference to FIG. 3 and FIG. 4. FIG. 3 is a diagram showing projection display apparatus 20 using phosphor lighting device 200 having fixed phosphor device 201. FIG. 4 is a diagram showing fixed phosphor device 201. FIG. 4(a) is a front view of fixed phosphor device 201, and FIG. 4(b) is a side view of fixed phosphor device 201. Here, the hatching in FIG. 3 and FIG. 4 allows the configuration to be understood, and does not show the cross section.

FIG. 3 is obtained by replacing phosphor wheel device 118 of FIG. 1 with fixed phosphor device 201, so that the descriptions of the optical configuration other than the fixed phosphor device are omitted.

As shown in FIG. 4, in phosphor 202 of fixed phosphor device 201, the cross sections (faces perpendicular to the paper plane) of phosphor pieces 202a to 202d having the same characteristic are disposed close to each other. In the second exemplary embodiment, four substantially-square phosphor pieces are two-dimensionally arranged adjacently to each other (vertical and horizontal directions), thereby producing a substantially square phosphor 202. Each of these phosphor pieces is a ceramic phosphor as a ceramic plate made of an inorganic material. On the face of phosphor 202 that is reverse to the excitation light incident face, reflective layer 203 for reflecting the light having a wavelength of fluorescent light is formed. Reflective layer 203 is fixed to spreader 204 having a high thermal conductivity via adhesive layer 205. Heat sink 206 is in close contact with the face of spreader 204 that is reverse to the face having the fixed phosphor pieces. In a portion of fixed phosphor device 201 where a part provided with phosphor 202 is excluded, a cooling means (not shown) may perform the heat dissipation.

The spot size of the excitation light generated by condenser lenses 116 and 117 must be included in a range of phosphor pieces 202a to 202d. When the excitation light is radiated to only the proximity of the center of phosphor 202, however, temperature non-uniformity occurs in each phosphor piece. Therefore, it is the most desirable that the spot of the excitation light is inscribed in the existing range of the phosphor. The shape of the phosphor formed of a plurality of phosphor pieces arranged adjacently to each other may be a rectangular or circular shape (a non-square shape), for example, in accordance with the spot shape of the excitation light.

Fluorescent light generated by fixed phosphor device 201 is also reflected by reflective layer 203 existing on the back side, and is radiated to condenser lens 117 side. The subsequent behaviors are the same as those in phosphor lighting device 100 of the first exemplary embodiment, so that the descriptions are omitted.

By forming the fixed phosphor device in that manner, the reliability and noise reduction can be achieved without requiring a rotation component (except cooling fan), and size reduction can be achieved depending on the configuration of a cooling means. Simplifying the configuration can reduce the cost.

Phosphor pieces 202a to 202d are fixed to spreader 204 via adhesive layer 205, and, actually, the thermal conductivity often decreases in this fixed part. However, in an aggregate of the phosphor pieces that are small pieces apt to release the stress strain as discussed above, the adhesive layer does not require a stress absorption function. Therefore, the adhesive layer can be formed in an extremely thin shape.

Furthermore, it is desirable that spreader 204 is made of ceramic (silicon carbide or silicon nitride), which is a material having a high thermal conductivity and a thermal expansion coefficient close to that of the phosphor. The thermal expansion coefficients of both compounds are equivalent to that of the phosphor, but the silicon carbide is more preferable because it has a thermal conductivity close to that of aluminum. These compounds can suppress the occurrence of stress due to the difference in thermal expansion coefficient between the spreader and the phosphor. Therefore, the thickness of adhesive layer 205 for bonding phosphor pieces to the spreader can be suppressed. This suppression reduces the temperature increase of the phosphor having been irradiated with the excitation light. Depending on the operating temperature limit, the processing can be performed even by means of diffusion bonding or the like that does not require an adhesive layer. In the diffusion bonding, the bonding is performed by diffusion of atoms in the material in accordance with the pressure and temperature. Therefore, differently from the case of using an adhesive, the thermal conductivity is not adversely affected, and a more excellent heat-dissipation structure can be achieved. In the case that the phosphor can be directly formed on the ceramic spreader—even when the phosphor is made of an inorganic material—, the phosphor can be certainly produced without using a bonding and adhesive means such as the diffusion bonding.

The adhesive layer can be replaced with a soldering or silver brazing layer similarly to the first exemplary embodiment. Furthermore, similarly to the first exemplary embodiment, the characteristics of the adhesive layer, the positions of the adhesive layer and reflective layer, and information related to them can be changed. The characteristics, for example, show that the adhesive layer has a reflective characteristic or the adhesive layer is made of a light-transmitting material.

Here, phosphor lighting device 200 can be formed as a lighting device and can generate white-color light. Therefore, phosphor lighting device 200 can be applicable to not only a projection display apparatus but also general lighting. In phosphor lighting device 200, especially, the configuration of phosphor wheel device 201 is distinctive, and is not limited to the optical path of the excitation light and is not limited to the configuration range from the phosphor wheel device to the rod integrator.

In the above-mentioned configuration, spreader 204 and heat sink 206 are disposed separately. However, a cooling means may be disposed in spreader 204 to form one component. That case eliminates the heat resistance on a close contact face, and hence is advantageous in cooling.

In this case, the cooling means is set as a heat sink, but is not limited to this. When a heat pipe or a heat receiving portion of a liquid-cooling device is replaced with spreader 204, a greater input energy can be also handled.

Until now, the cooling portion is set at the face of spreader 204 that is reverse to the phosphor-piece fixed face. However, the peripheries or faces of the phosphor pieces that are disposed on the phosphor-piece fixed face may be directly cooled by a different cooling means.

As discussed above, the exemplary embodiments have been described as examples of the technology disclosed by the present application. However, the technology disclosed by the present disclosure is not limited to this, and can be appropriately applied also to an exemplary embodiment having undergone modification, replacement, addition, or omission. A new exemplary embodiment may be produced by combining the components described by the exemplary embodiments.

INDUSTRIAL APPLICABILITY

The present disclosure can be applied to a lighting device using a ceramic phosphor, and a projection display apparatus.

What is claimed is:

1. A projection display apparatus comprising: a lighting device including: an excitation light source; a phosphor configured to receive an excitation light from the excitation light source and emit a fluorescent light; a spreader configured to support the phosphor; and a reflective layer disposed between the phosphor and the spreader, and configured to reflect the fluorescent light, wherein the phosphor is a plurality of phosphor pieces disposed to be adjacent to each other and having same characteristic, the spreader has a disk shape, the plurality of phosphor pieces are disposed in a circumferential direction of the spreader so as to form an annular shape, and a motor is disposed in a center of the spreader so that the spreader can rotate; a detector configured to detect a rotation position of a butted portion disposed between the plurality of phosphor pieces adjacent to each other; an image display element configured to modulate a light outgoing from the lighting device in response to an image signal, and to generate an image light; and a projection lens configured to enlarge and project the image light generated by the image display element, wherein, based on the rotation position of the butted portion detected by the detector, at a timing at which the excitation light arrives at the butted portion, an output of image display is changed to suppress luminance change of the image light.

2. A projection display apparatus comprising: a lighting device including; an excitation light source; a phosphor configured to receive an excitation light from the excitation light source and emit a fluorescent light; a spreader configured to support the phosphor; and a reflective layer disposed between the phosphor and the spreader, and configured to reflect the fluorescent light, wherein the phosphor is a plurality of phosphor pieces disposed to be adjacent to each other and having same characteristic, the spreader has a disk shape, the plurality of phosphor pieces are disposed in a circumferential direction of the spreader so as to form an annular shape, and a motor is disposed in a center of the spreader so that the spreader can rotate; a detector configured to detect a rotation position of a butted portion disposed between the plurality of phosphor pieces adjacent to each other; an image display element configured to modulate a light outgoing from the lighting device in response to an image signal, and to generate an image light; and a projection lens configured to enlarge and project the image light generated by the image display element, wherein the lighting device includes a plurality of the spreaders, and wherein, based on the rotation position of the butted portion detected by the detector, a timing at which the excitation light arrives at the butted portion of the phosphor is controlled so as to change between the plurality of spreaders.

* * * * *